United States Patent [19]
Crask

[11] 3,911,592
[45] Oct. 14, 1975

[54] TILT DETECTOR AND SYSTEM
[75] Inventor: Geoffrey J. Crask, Santa Ana, Calif.
[73] Assignee: Hydril Company, Los Angeles, Calif.
[22] Filed: Feb. 25, 1974
[21] Appl. No.: 445,639

[52] U.S. Cl. .................. 33/378; 33/1 H; 33/366
[51] Int. Cl.² ..................... G01C 9/22; G01C 9/06
[58] Field of Search ............ 33/365, 366, 367, 377, 33/378, 1 H

[56] References Cited
UNITED STATES PATENTS

| | | | |
|---|---|---|---|
| 738,407 | 9/1903 | Cable | 33/378 |
| 1,423,529 | 7/1922 | King et al. | 33/378 |
| 1,552,691 | 9/1925 | Girvin | 33/378 |
| 1,576,470 | 3/1926 | Richardson | 33/378 |
| 2,804,692 | 9/1957 | Karstens | 33/366 |

FOREIGN PATENTS OR APPLICATIONS

| | | | |
|---|---|---|---|
| 678,826 | 12/1964 | Italy | 33/367 |
| 301,098 | 9/1932 | Italy | 33/377 |
| 213,790 | 2/1961 | Austria | 33/378 |
| 630,173 | 4/1936 | Germany | 33/366 |

Primary Examiner—Harry N. Haroian
Assistant Examiner—Richard R. Stearns
Attorney, Agent, or Firm—William W. Haefliger

[57] ABSTRACT

A tilt detector is provided especially for use in operating sub-sea drilling equipment including a tool stack at the ocean floor. One such detector is carried by the stack to produce a first output; another detector is carried by a riser pipe near a ball joint interconnecting the stack and pipe to produce a second output, and the outputs are processed to facilitate maneuvering of a drilling vessel. The detector includes:
  a. a container,
  b. liquid in the container having an upper surface tending to remain generally horizontal as the container tilts, and
  c. sensors having independently movable members engaging the liquid at spaced locations to sense the relative levels of the liquid surface at said locations and relative to the container during said tilting.

8 Claims, 24 Drawing Figures

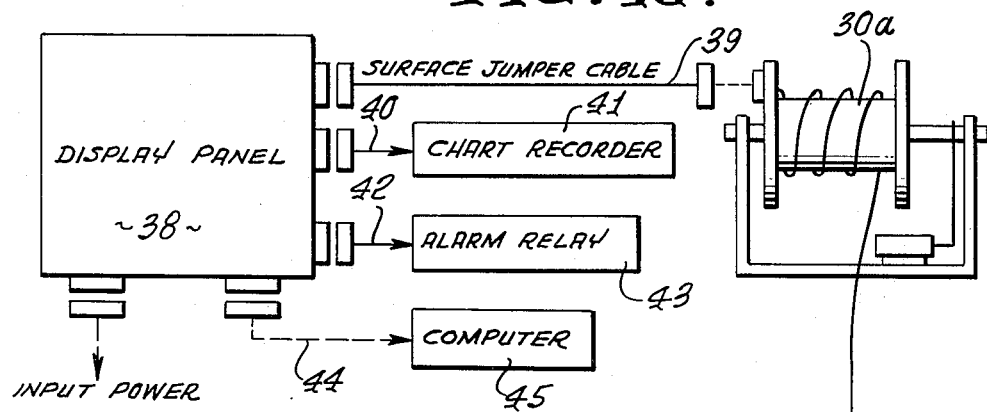
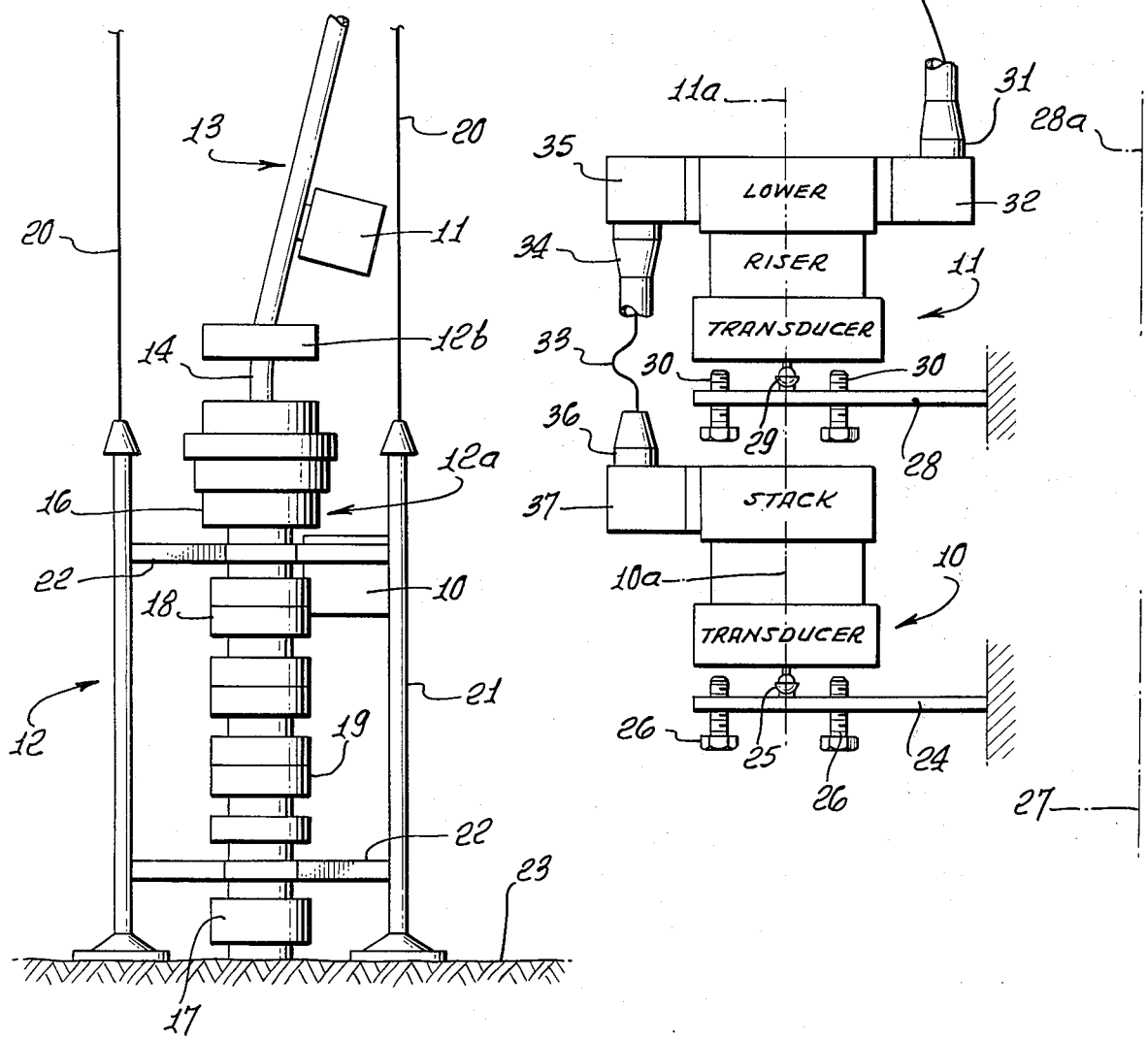

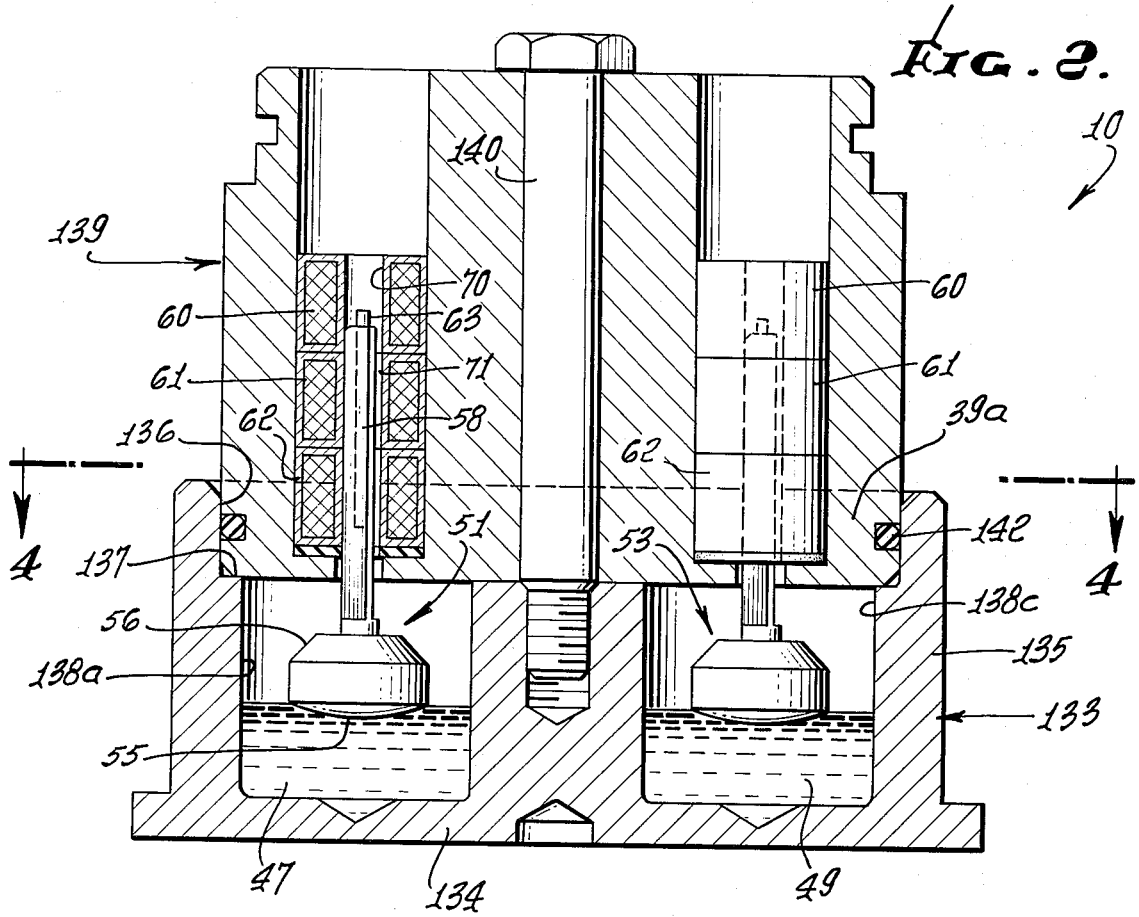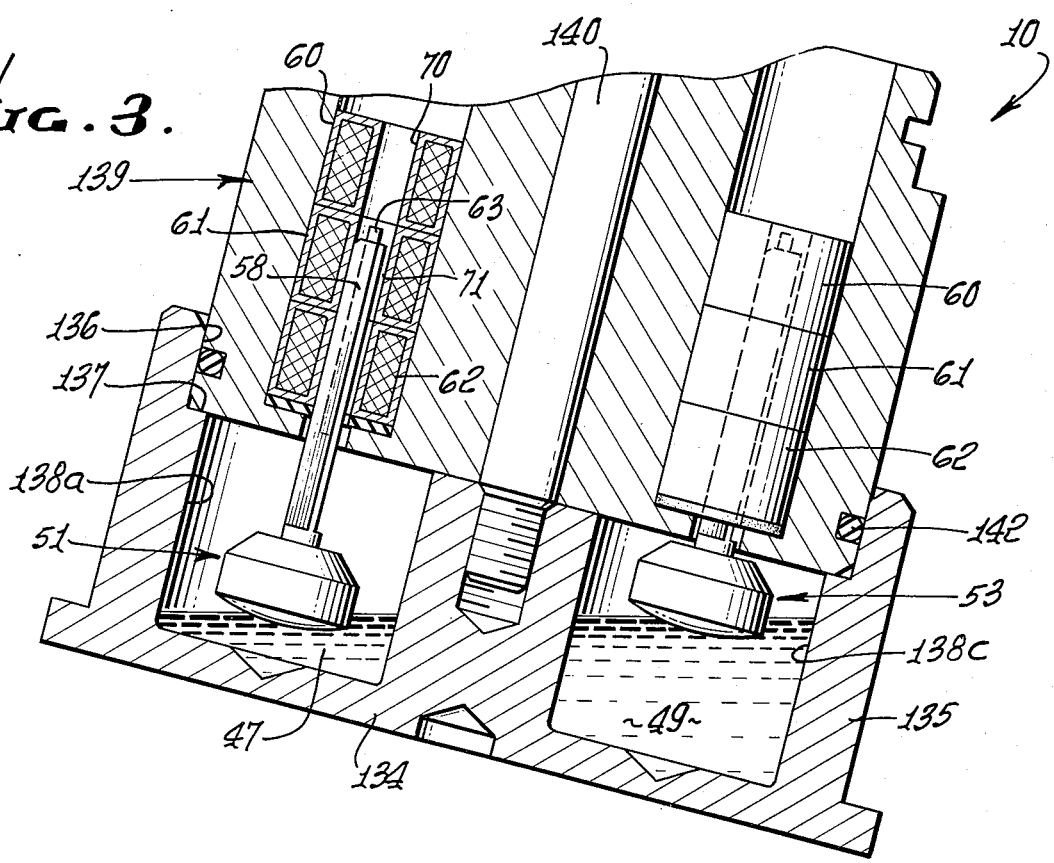

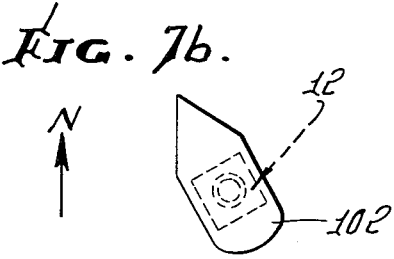
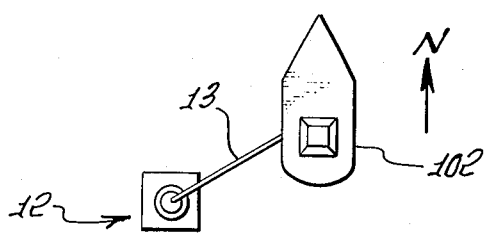
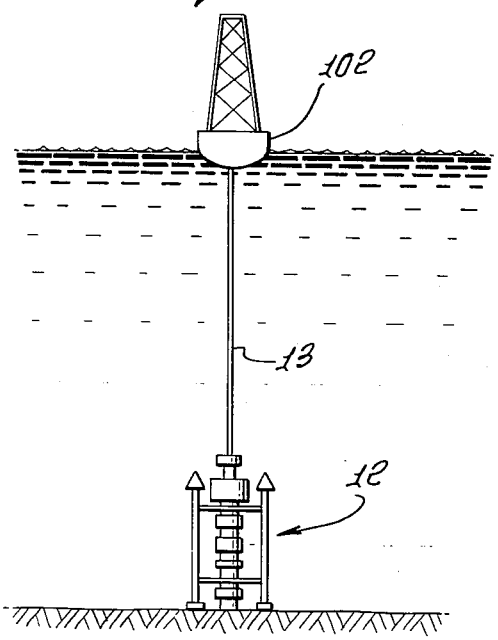
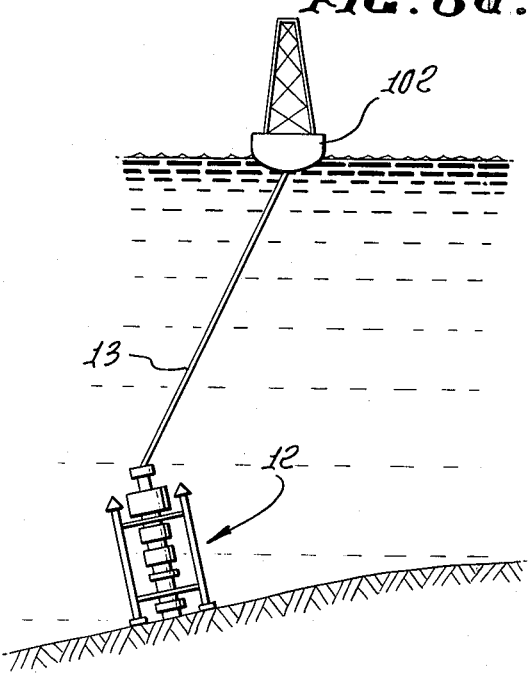
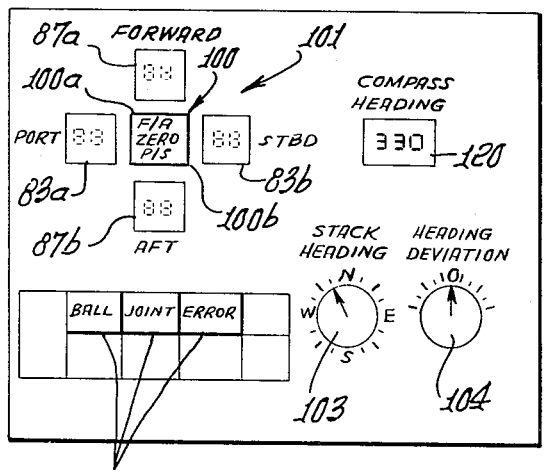
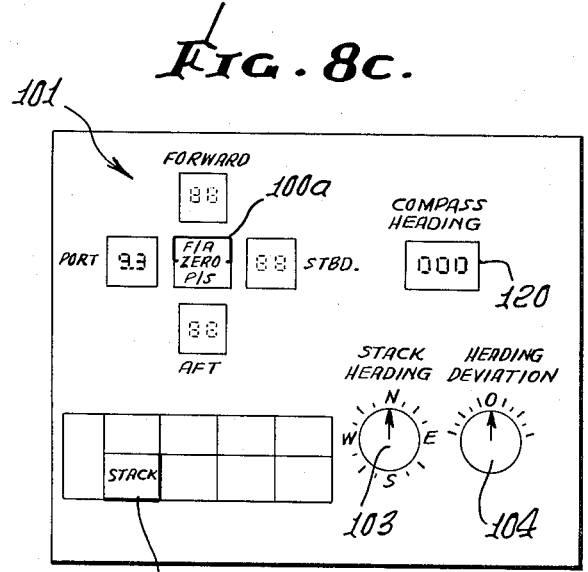

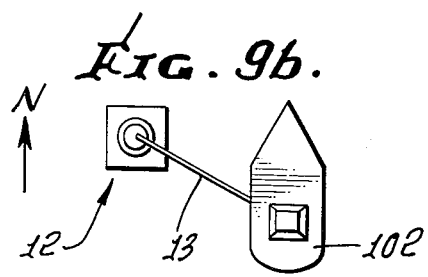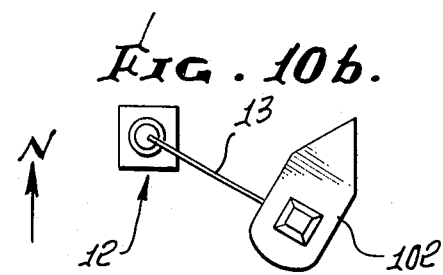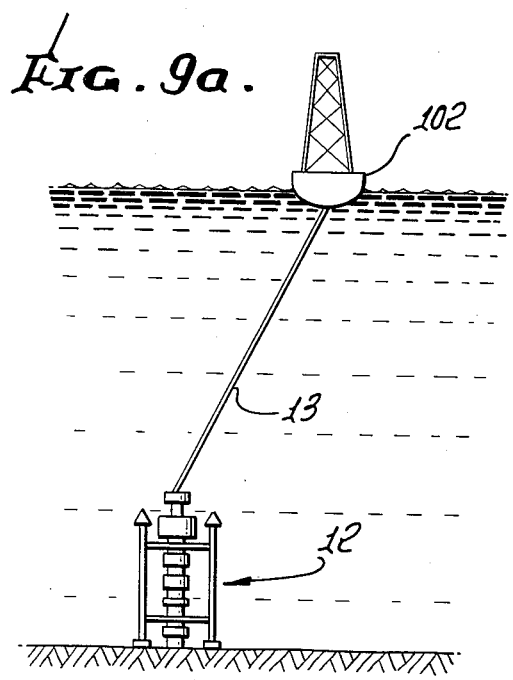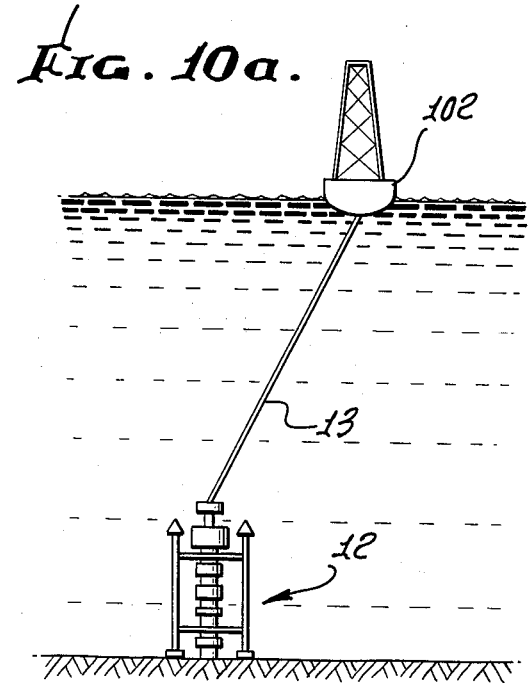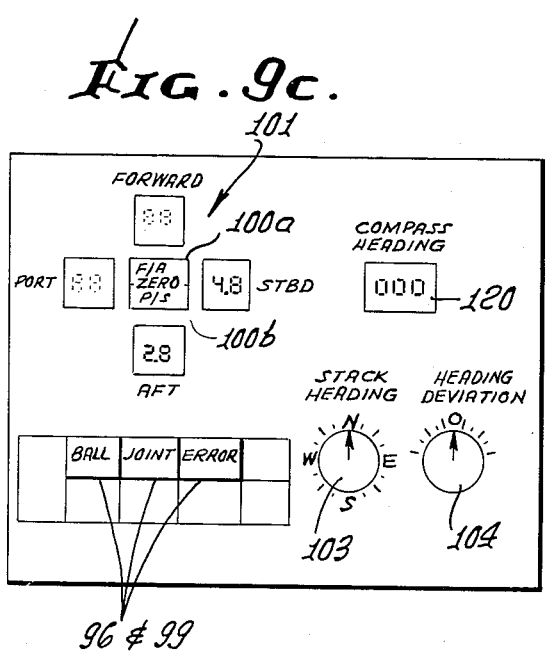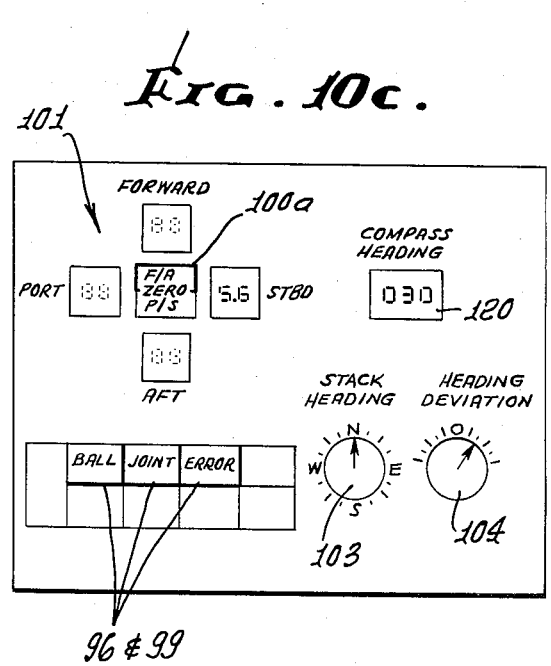

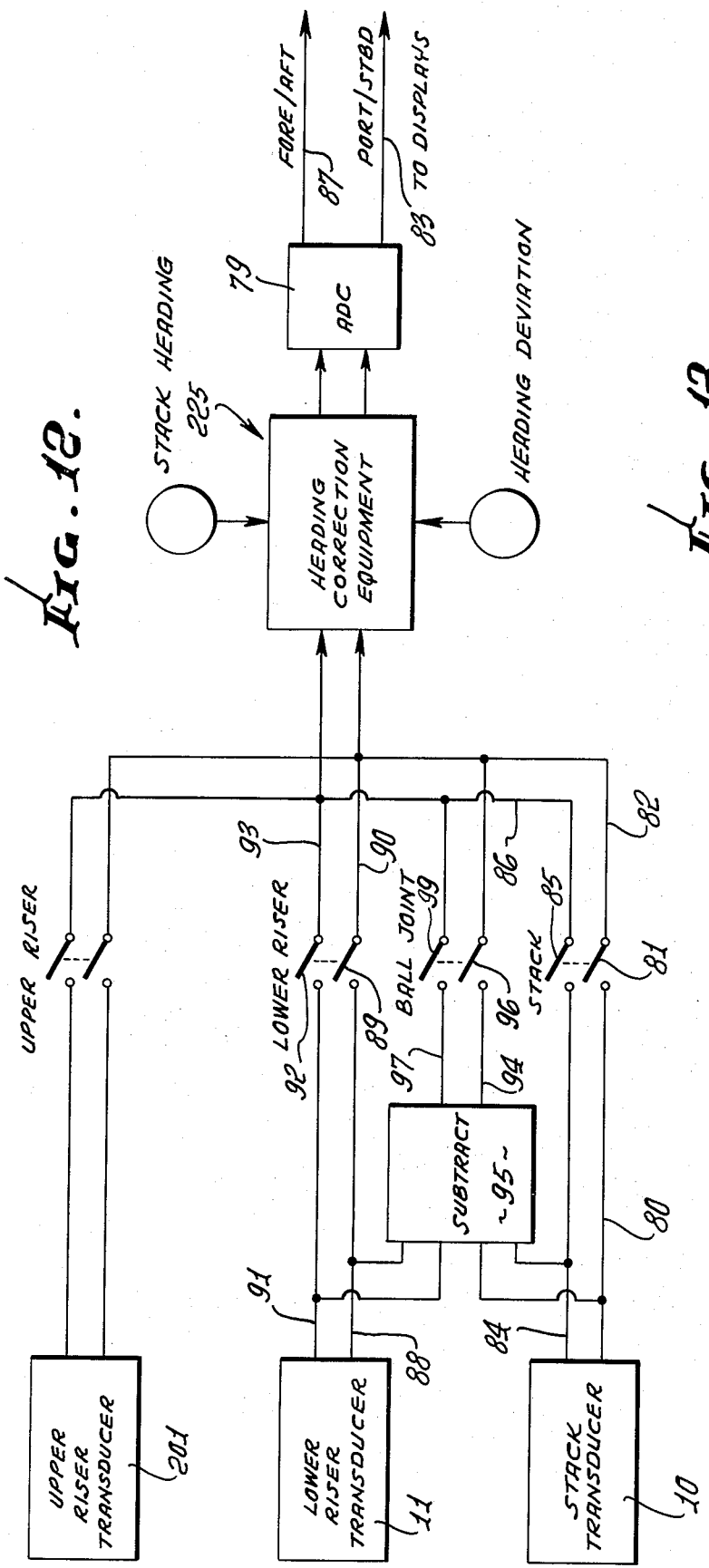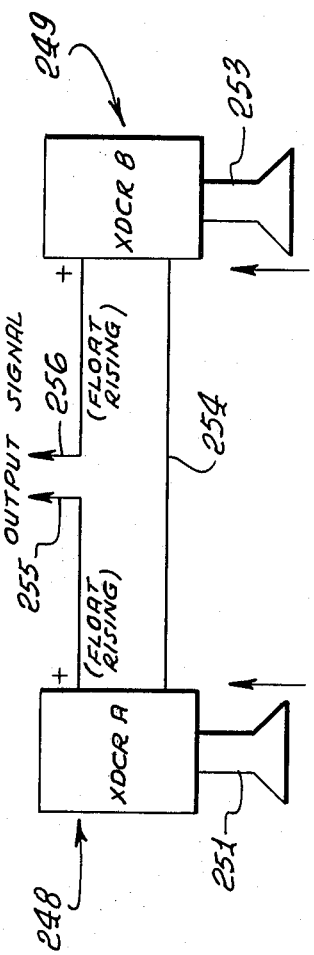

TILT DETECTOR AND SYSTEM

BACKGROUND OF THE INVENTION

This invention relates generally to tilt detection, and more particularly concerns the provision of a tilt detector of improved construction and its use in a system for aligning a sub-sea riser pipe with a stack of sub-sea well head equipment.

There is a continuing need for tilt detection equipment characterized by simplicity, rugged construction, insensitivity or low sensitivity to vibration (enabling use on well drilling equipment), two axis tilt sensitivity, immunity to temperature drift, and capability for operation after inversion despite use of liquid mercury as a pendulum. There is also need for a simple control system for maintaining alignment of a riser pipe with sub-sea well head equipment. No prior equipment meets the above needs in the unusually advantageous manner as will be described herein.

SUMMARY OF THE INVENTION

Basically, the tilt detector of the invention comprises a container; liquid (as for example mercury) in the container having an upper surface tending to remain generally horizontal as the container tilts, and sensors having independently movable members (as for example floats engaging the liquid at spaced locations to sense the relative levels of the liquid surface at spaced locations and relative to the container during such tilting. As will be seen, the liquid in the container may define pools having restricted intercommunication, the pools respectively engaged by the sensors, thereby to provide reduced sensitivity to vibration; the floats may have upper surfaces which taper upwardly to drain liquid off the floats and into the pools; and the sensors may include plungers carried by the floats (the plungers carrying cores magnetically coupled to differential transformer coils), the plungers having cross sections to form liquid drainage spaces, for return flow to the pools.

It is another object of the invention to provide first and second pools as described, to float first and second floats at opposite sides of an upright axis defined by the detector, and third and fourth pools to float third and fourth floats at opposite sides of that axis, the first and second floats and associated plungers located in 90° relation to the third and fourth plungers and associated plungers, thereby to provide enhanced sensitivity to tilt in two planes, as well as temperature change insensitivity, as will be described.

It is a still further object of the invention to provide two detectors as described, one adjustably carried by a sub-sea stack of well head equipment, and the other adjustably carried by a riser pipe above a ball joint. As will be seen, control means is provided at the ocean surface, as for example on a drilling vessel, and is operatively connected with the circuitry of each sensor on each detector to achieve a visual display corresponding to the absolute tilts of the detectors, as well as the relative tilt therebetween, enabling vessel maneuver to eliminate or reduce such relative tilt, in a simple manner.

These and other objects and advantages of the invention, as well as the details of an illustrative embodiment, will be more fully understood from the following description and drawings, in which:

DRAWING DESCRIPTION

FIG. 1 is a schematic diagram of a sub-sea riser tilt control system;

FIG. 1a is a more complete schematic of the FIG. 1 system;

FIG. 2 is an elevation, in section, showing details of construction of one preferred transducer, as used in FIGS. 1 and 1a;

FIG. 3 is a view like FIG. 2, showing a tilted condition of the FIG. 2 transducer;

FIG. 7a is an elevation showing one alignment condition of a sub-sea riser and stack;

FIG. 7b is a top plan view of the drilling vessel shown in FIG. 7a;

FIG. 7c is a view of a surface display panel associated with the FIG. 7a condition;

FIG. 8a is an elevation showing another relative alignment condition of the sub-sea riser and stack first shown in FIG. 7a, and as related to the drilling vessel;

FIG. 8b is a top plan view of the drilling vessel shown in FIG. 8a;

FIG. 8c is a view of the surface display panel indicating stack tilt for FIGS. 8a and 8b;

FIG. 9a is an elevation showing a further relative alignment condition of the sub-sea riser and stack, as related to the drilling vessel;

FIG. 9b is a top plan view of the drilling vessel shown in FIG. 8a;

FIG. 9c is a view of the surface display panel indicating ball joint error for FIGS. 9a and 9b;

FIG. 10a is an elevation showing a still further relative alignment condition as between the sub-sea riser and stack and the drilling vessel, the relative heading of which has changed from FIG. 9a and 9b;

FIG. 10b is a top plan view of the drilling vessel shown in FIG. 10a;

FIG. 10c is a view of the surface display panel indicating ball joint error for FIGS. 10a and 10b;

FIGS. 12–13 are circuit diagrams.

DETAILED DESCRIPTION

Figure 4:
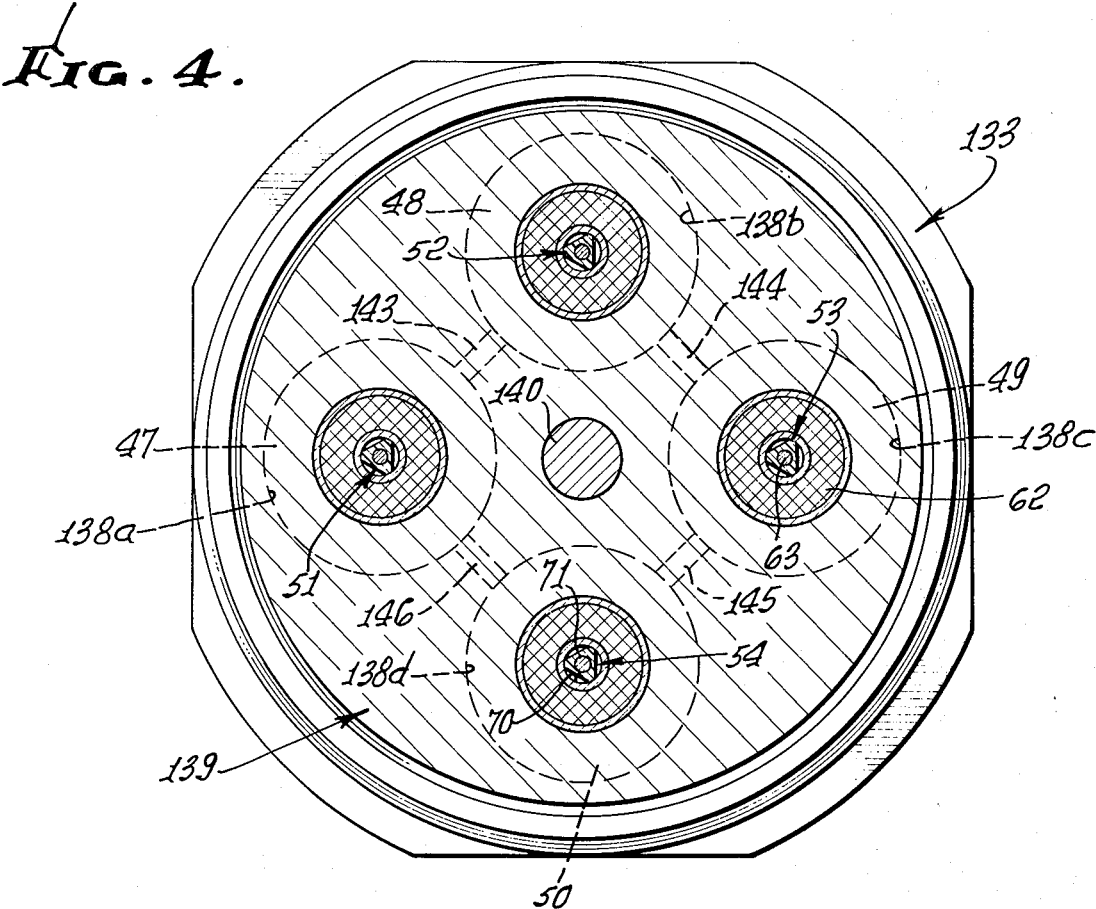
FIG. 4 is a section taken on line 4—4 of FIG. 2.
Figure 5:
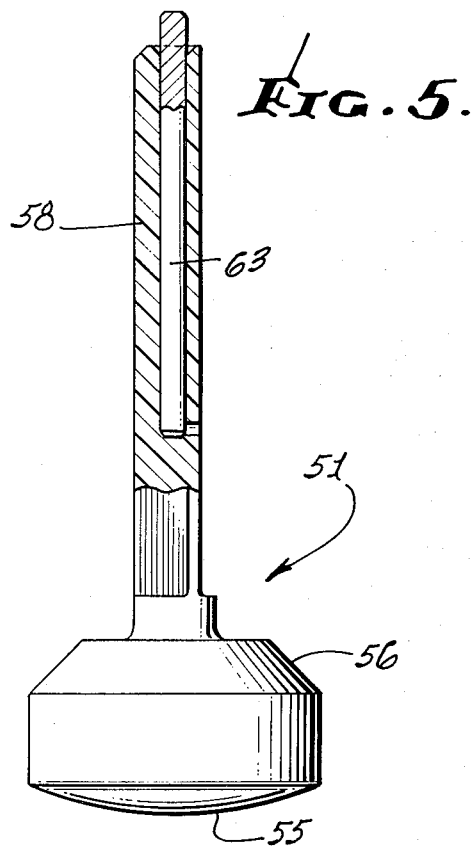
FIG. 5 is an enlarged elevation, partly in section showing the construction of a float as used in the transducer.
Figure 6:
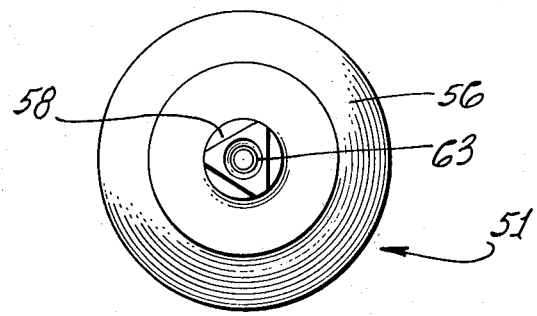
FIG. 6 is an end view of the FIG. 5 float.

Referring first to FIG. 1, two tilt detectors or transducers 10 and 11 are shown in combination with sub-sea well head equipment 12. One detector 10 is carried by the equipment stack 12a, and the other detector 11 is carried by a riser pipe 13 projecting generally upwardly from the stack. A ball joint 12b connects the lower end of the riser pipe 13 with stub casing 14 associated with the stack, allowing the riser to pivot angularly about that joint, as influenced by changes in surface vessel position and/or by underwater currents, without deflecting or displacing the stack. The riser normally protectively contains pipe or tubing extending between the surface and the stack at the ocean floor. Merely as illustrative, the stack may also include a well blow-out preventer 16, well head connectors 17 and 18, a mud valve 19, and other equipment. Also shown are guy wires 20 and guides 21 therefor attached to the stack via bracket arms 22, enabling guided lifted and lowering of the stack between the surface and the ocean floor 23. FIGS. 7a, 7b; 8a and 8b; 9a and 9b; and 10a and 10b also show various relative orientations of a surface vessel, sub-surface stack, and riser pipe extending therebetween, as will be described.

FIG. 1a illustrates, schematically, the detector or transducer 10 carried by the stack 12 as via a mounting and leveling plate 24. The detector may be connected with plate 24 as via a universal pivot connection 25 and three leveling screws 26 having threaded connection with plate 24 may be adjusted as respects their bearing against the underside of the detector to initially align the detector axis 10a in parallel relation with the stack vertical central axis schematically indicated at 27. Similarly, the detector or transducer 11 is carried by the riser pipe 13 as via a mounting or leveling plate 28. Detector 11 may be connected with plate 28 as by universal pivot connection 29, and three leveling screws 30 having threaded connection with plate 28 may be adjusted as respects their bearing against the underside of detector 11 to initially align the detector axis 11a in parallel relation with the axis 28a of the lower end of the riser. Accordingly, means is provided to adjust the angularities of the detectors relative to the stack and to the riser pipe, respectively.

FIG. 1a also shows, schematically, an armored signal cable 29a extending between a cable reel 30a at the surface and the detectors. As seen, a plug connection 31 at the lower end of the cable may fit a socket at 32 associated with transducer or detector 11; and a jumper cable 33 may have plug connection at 34 with a socket 35, and plug connection at 36 with a socket 37. The latter is associated with transducer 10, and the former socket 34 has electrical connection with plug 31 via socket 32. Accordingly, the transducer outputs are transmitted to the surface via series cables 33 and 29a. The upper reeled end of cable 29a has connection with surface display circuitry 38 via a jumper cable 39, the circuitry 38 having an analog output at 40 to a strip chart recorder 41, an output at 42 to an alarm relay 43, and a digital output at 44 to a computer 45.

Referring now to FIGS. 2–6, the tilt detector 10 (which is also representative of detector 11) basically comprises a container; liquid in the container having an upper surface tending to remain generally horizontal as the container tilts; and sensors having independently movable members engaging the liquid at spaced location to sense the relative levels of the liquid surface at such locations and relative to the container, during such tilting. In the example, the container is shown to comprise a receptacle shaped body having a base 134, an annular upper rim 135 defining a bore 136; an inner upwardly facing shoulder 137; and four like recesses or wells 138a–138d sunk downwardly in the body from the inner surface 137.

The container also includes a cap or casing 139 which fits downwardly at 39a into the bore 136 and has a lower end face seating against shoulder 137, there being a central fastener 140 which connects the cap to the body. O-ring seal 142 seals off between the bore 136 and the casing 139, whereby the wells 138a–138d are sealed off from the exterior; however, there are lateral ports 143–146 drilled in the body 133 to restrictively intercommunicate the lower interiors of the wells, as shown, whereby liquid such as mercury in the wells drains from higher to lower wells during tilting of the detector. Such ports dampen or slow changes in mercury level in the wells during changes in detector tilt, so that a more accurate output signal (indicative of tilt) is realized, as will appear.

Pools of mercury or other suitable liquid in the wells are indicated at 47–50.

Figure 11:
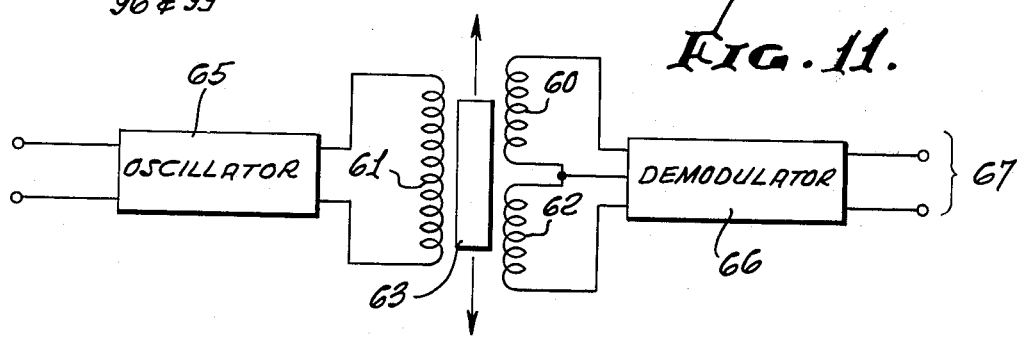
FIG. 11 is a view of differential transformer circuitry.

The movable sensor members referred to above may with unusual advantage comprise plastic floats 51–54 having convex undersides, indicated at 55, to effectively engage the liquid mercury pool surface during various conditions of tilt, as for example as illustrated in FIG. 3; also, the floats have frusto-conically upwardly tapering upper sides 56, to effectively shed mercury wetting such upper sides after return of the detectors to near FIG. 2 upright position following extreme tilt or inversion of the unit. Further, the floats carry plungers 58 movable endwise within bores 70 formed by differential transformer coils 60–62. Magnetic cores 63 carried by the plungers have variable magnetic coupling with the coils, depending on the endwise position of the cores, as is also clear from the FIG. 11 differential transformer circuit. As there shown, the output of oscillator 65 is impressed on coil 61 with which differentially wound coils 60 and 62 are inductively coupled. The DC output at 67 of a demodulator 66 connected with coils 60 and 62 is a function of the endwise position of the core 63. Accordingly, the tilt of the detector determines the core position relative to the coils, which in turn determines DC output of the differential transformer associated with each core. Two such floats such as at 51 and 52 located at 90° angles about the detector axis 10a are sufficient to determine the azimuthal direction of tilt and the degree of such tilt; however, the two additonal floats 53–54 and associated circuitry serve to increase the accuracy of the equipment and also provide temperature drift insensitivity. Thus, the outputs of transformers associated with 180° angle related floats 51 and 53 may be added, i.e. differenced, to obtain an analog DC value representative of tilt in one (port and starboard) direction, whereas the outputs associated with 180° related floats 52 and 54 may be added to obtain an analog DC value representative of tilt in another (fore and aft) direction. Temperature change induced changes in mercury level do not affect the "difference" output referred to.

From FIGS. 2–6, it will be seen that the plungers have generally polygonal (as for example generally triangular) cross sections along plunger lengths movable endwise within guide bores 70 surrounded by the coils, thereby to form liquid drainage spaces 71 between the bore and plungers. Accordingly, liquid mercury never collects between the plungers and bores to impede endwise travel of the plungers in the bores, when the detector is in upright position, but rather such mercury freely drains via the spaces 71 back into the pools 47–50 as described.

Referring now to FIG. 12, it will be seen that the "port and starboard" analog output at 80 of the stack transducer 10 may be passed via switch 81 and lead 82 to an analog to digital converter 79 and thence at 83 to a port and starboard digital display; and "fore and aft" analog output at 84 of transducer 10 may be passed via switch 85 and lead 86 to the ADC 79 and thence at 87 to the fore and aft digital display. Alternatively, the "port and starboard" analog output at 88 of the lower riser transducer 11 may be passed via switch 89 and lead 90 to ADC 79 and thence to display 83; and fore and aft analog output at 91 of transducer 11 may be passed via switch 92 and lead 93 to the ADC 79 and thence to display 87. In addition, a so-called port and starboard "ball joint error" analog output at 94 may be obtained by adding at 95 (i.e. differencing) the outputs 80 and 88 of the transducers 10 and 11, and the output 94 may be passed via a switch 96 to the ADC 79 for digital display at 83. Similarly, a so-called fore and aft "ball joint error" analog output at 97 may be obtained by adding at 95 (i.e. differencing) the outputs 84 and 91 of the transducers 10 and 11, and the output 97 may be passed via a switch 99 to ADC 79 for digital display at 87. The FIG. 13 circuit may be used at 95 in FIG. 12. Finally, an upper riser transducer 201 may be provided with connections similar to those for the lower riser transducer 11. Heading correction equipment 225 may be connected in series with the ADC at the input side thereof, and its use will be described in terms of "correcting" the analog input to the ADC.

FIG. 7c shows a panel having a DEGREES TILT DISPLAY 101 that includes PORT and STARBOARD 2-digit displays 83a and 83b, and FORWARD and AFT 2-digit displays 87a and 87b. In addition, in ZERO TILT display 100 is provided, and includes a FORE and AFT (F/A) section 101a which illuminates when FORE and AFT tilt is zero, and a PORT and STARBOARD section 101b which illuminates when Port and Starboard tilt is zero.

The following examples of Riser/Stack Alignment are provided to give a better understanding of the various situations in which the system can be used. In all of the examples, the DEGREES TILT Display 101 indicates the position of the transducers with respect to true vertical. The "BALL JOINT ERROR" indicates the TILT ERROR difference between the lower riser transducer and the stack transducer. The direction in which the drilling vessel 102 needs to move (as seen in FIG. 7b) in order to align the riser with the stack 12 is opposite from that displayed. In other words, if a starboard ball joint error is indicated, the drilling vessel must move to the port in order to align the riser 13 with the stack.

Example No. 1 (Refer to FIGS. 7a to 7c)

In FIG. 7a the stack 12 is shown perfectly vertical and the drilling vessel 102 is directly over the stack. In this perfect condition, there is "0" ball joint error which is indicated by both sections 100a and 100b of the ZERO TILT Display being illuminated. A display of ball joint error is achieved by depressing switches or pushbuttons 96 and 99. Note: When there is "0" tilt in a plane the two digital displays associated with that plane will be dark. The appropriate section of the ZERO TILT Display will be illuminated.

In FIG. 7c the stack heading has been entered on a STACK HEADING SWITCH 103 as 330°. Since the drilling vessel heading in FIG. 7b is identical to the stack heading, a HEADING DEVIATION switch 104 is set to "0." The significance of switches 103 and 104 will be discussed later.

Example No. 2 (Refer to FIGS. 8a, 8b, & 8c)

In FIG. 8c the DEGREES TILT Displays are indicating the tilt registered by the stack transducer. This is accomplished by the operator depressing the "STACK" pushbutton which closes switches 81 and 85 in FIG. 12 for example. In this example the stack has a 9.3° tilt to the port. The Forward/Aft Stack Alignment is perfectly vertical and indicated by the F/A Section 100a of the ZERO TILT Display being illuminated. The stack and vessel are heading due North and are so indicated by the STACK HEADING AND HEADING DEVIATION switches 103 and 104.

Figure 8D:
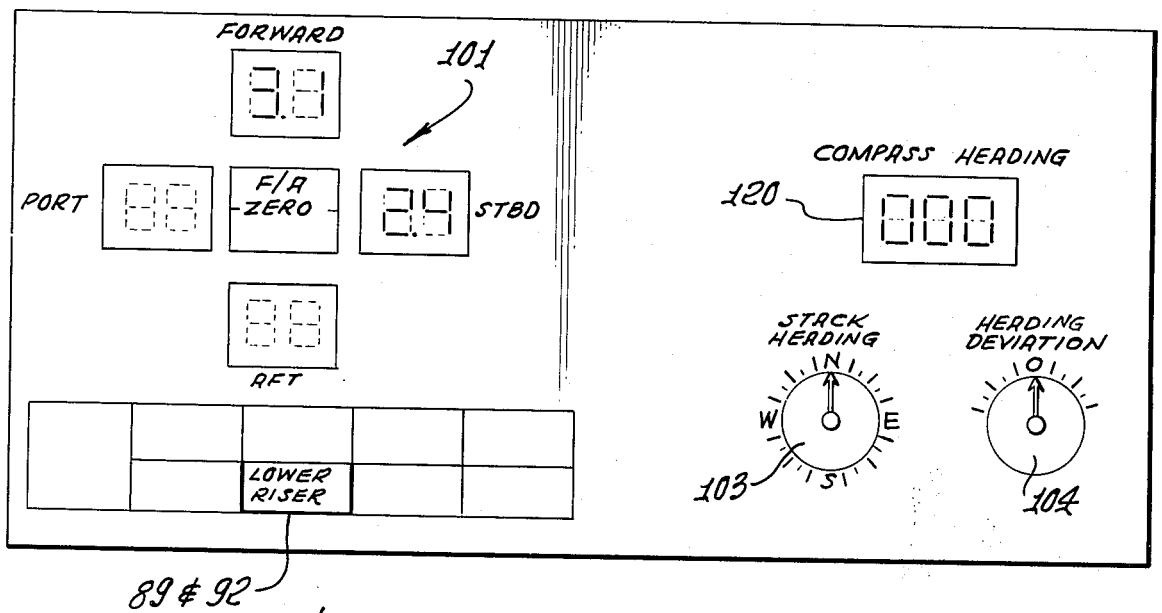
FIG. 8d is a view of the surface display panel indicating lower riser tilt for FIGS. 8a and 8b.

FIG. 8d indicates the tilt measured by the LOWER RISER transducer. This is accomplished by the operator depressing the LOWER RISER pushbutton which closes switches 89 and 92 in FIG. 12. In this example we see that the lower riser transducer 11 indicates a 3.1° forward tilt and a 2.4° starboard tilt. If the drilling vessel in FIG. 8b were moved to the port and aft and directly over the stack, the LOWER RISER DEGREES TILT Display would indicate F/A and P/S equal "0." However, because of the port tilt of the stack, the riser and stack would not yet be correctly aligned.

Figure 8E:
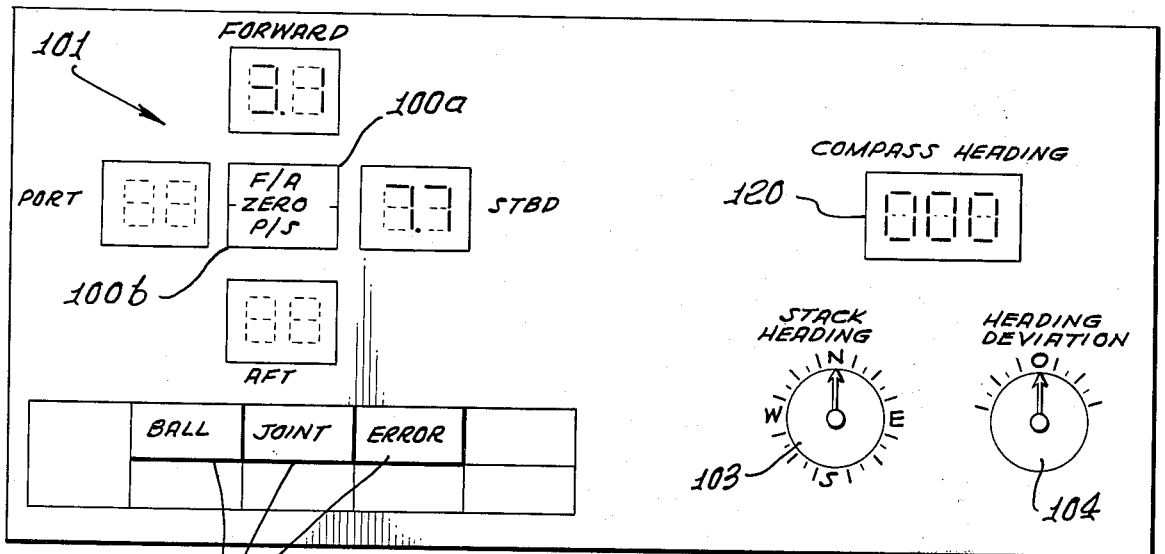
FIG. 8e is a view of the surface display panel indicating ball joint error for FIGS. 8a and 8b.

In FIG. 8e we see displayed the BALL JOINT ERROR which is the difference between the riser and stack angularities relative to vertical. If the drilling vessel is now moved aft and port until the F/A and P/S ZERO Displays 100a and 100b are illuminated, the vessel will be displaced to the port of the stack. However because of the port tilt of the stack, the riser and stack would then be in proper alignment.

Example No. 3 (Refer to FIGS. 9a, 9b, 9c and FIGS. 10a, 10b and 10c)

In FIG. 9a the stack alignment is perfectly vertical. A BALL JOINT ERROR of 4.8° starboard and 2.8° aft is indicated because the drilling vessel in FIG. 9b is horizontally displaced and not directly over the stack. The drilling vessel is heading due North which is the same heading as the stack. In order to obtain proper riser/stack alignment, the vessel must move forward and to the port until it is directly over the stack.

In FIG. 10a the stack and riser angles have not changed; however the drilling vessel is no longer on the same heading as the stack (due North). The new vessel heading of 330° is entered into the display panel by rotating the HEADING DEVIATION switch 104 until the vessel heading is indicated by the COMPASS HEADING Display 120. Without the HEADING DEVIATION adjustment, the BALL JOINT ERROR Display in FIG. 10c would be identical to in FIG. 9c, indicating 4.8° starboard tilt and 2.8° aft tilt. With that indication, if the drilling vessel were to move forward to compensate for the aft tilt of the riser, the vessel would be moving further away from the stack. In this regard, the HEADING DEVIATION switch 104 automatically compensates the BALL JOINT ERROR Display so that the vessel will be moved in the proper direction to achieve perfect riser/stack alignment. The BALL JOINT ERROR Display in FIG. 10c indicates that, because of the 330° heading deviation, the vessel need only move to the port to properly align the riser with the stack.

In FIG. 12, compensation input 225 to the ADC corresponds to the input provided by switch 104.

Certain important advantages of the detectors and system are summarized as follows: the use of a fluid metal pendulum as disclosed to sense vertical eliminates need for mechanical pendulum supports subject to damage under shock loading conditions, it combines low natural frequency with relatively small size, it provides relatively large viscous damping in conjunction with the flow ports between the wells, and its operation remains unaffected following accidental inversions, and it affords high surface tension as well as maximum surface position stiffness to measuring float position errors; the use of lightweight, plastic floats to detect fluid pendulum surface position provides for physical characteristics such as low density, lack of electrical conductivity and absence of magnetic properties, and the positions of the floats are primarily controlled by fluid surface tension rather than float buoyancy to eliminate errors due to fluid contact angle variations with the float surfaces; the float shapes provide independence of fluid contact surface shape from tilt angle, elimination of output non-linearities, and the float upper surfaces promote drainage of fluid after angle overloads, eliminating zero-shifts; and the float plunger shapes eliminate pendulum fluid hold-up or retention in the guides, as described.

Further, the use of differential transformers to detect float positions results in negligible friction or stiffness force application to the floats and plungers, and such transformers are relatively immune to damage due to shock and vibration and they embody no moving electrical components so that wear is not a factor; the use of dual differential transformers enables cancellation of errors due to differential expansions of fluid, case and displacement sensor components; the Cartesian format, decimal angle, display readouts provide for unambiguous and immediate display of error quadrants, error-free readout of cartesian components of angles referred to ship axes, and use of a "zero error angle" target indicator eliminates display ambiguities at zero points. Finally, the provision for manual insertion of ship heading correction eliminates need for operator mental calculation to correct for ship heading changes, and the use of low cost axis transformations allows adequate compensation of the tilt displays, in the range of ± 10° of tilt, by 15° azimuth increments.

FIG. 13 shows typical electrical connections for a differential pair of transducers 248 and 249 in one plane, as for example at the stack, lower riser, or upper riser. Floats 251 and 253 correspond to floats 51 and 53 previously described. Note cross-over connection 254 between the coils of the differentially connected transducers, and the output leads 255 and 256.

I claim:
1. A tilt detector, comprising,
 a. a container,
 b. liquid in the container having an upper surface tending to remain generally horizontal as the container tilts,
 c. sensors having independently movable members engaging the liquid at spaced locations to sense the relative levels of the liquid surface at said locations and with respect to the container during said tilting,
 d. there being wells and ports formed in the container, the ports interconnecting the wells, the liquid in the container defining pools in said wells and having restricted intercommunication via said ports, said members comprising floats engaging the liquid pools at the surface thereof,
 e. said sensors also including plungers connected to the floats, there being differential transformer coils magnetically coupled to cores on the plungers, said plungers dimensioned to be movable endwise within guide bores surrounded by said coils, portions of the cross sections of said plungers being radially different from the cross sections of said guide bores to form liquid drainage spaces between the plungers and bores communicating with said wells, said bores formed in an upper portion of the container relative to said wells.

2. The detector of claim 1 wherein the detector defines a longitudinal generally upright axis, first and second of said pools and corresponding first and second sensors are spaced apart in one lateral direction generally normal to said longitudinal axis, and third and fourth of said pools and corresponding third and fourth sensors are spaced apart in another lateral direction generally normal to both said longitudinal axis and said one lateral axis.

3. The detector of claim 1 wherein the detector defines a longitudinally generally upright axis, and said floats have upper surfaces which slope downwardly and toward the float peripheries to drain said liquid into said pools.

4. The detector of claim 1 wherein said floats have convex undersides to engage said liquid, and upwardly tapering upper surfaces.

5. The detector of claim 1 including circuitry connected with said transformer coils to produce an output corresponding to said tilt of the detector.

6. The detector of claim 5 wherein at least two of said floats are located at approximately a 90° angle about an upright axis defined by the detector.

7. The detector of claim 5 wherein two of said floats are located at opposite sides of an upright axis defined by the detector.

8. A tilt detector comprising,
 a. a container,
 b. liquid in the container having an upper surface tending to remain generally horizontal as the container tilts,
 c. sensors having independently movable members engaging the liquid at spaced locations to sense the relative levels of the liquid surface at said locations and with respect to the container during said tilting,
 d. there being wells and ports formed in the container, the ports interconnecting the wells, the liquid in the container defining pools in said wells and having restricted intercommunication via said ports, said members comprising floats engaging the liquid pools at the surface thereof,
 e. said sensors also including plungers connected to the floats, there being differential transformer coils magnetically coupled to cores on the plungers, said plungers having generally polygonal cross sections along plunger length dimensioned to be movable endwise within generally circular guide bores surrounded by said coils, thereby to form liquid drainage spaces between the plungers and bores, said bores formed in an upper portion of the container.

* * * * *